(12) United States Patent
Doering

(10) Patent No.: US 9,612,700 B2
(45) Date of Patent: Apr. 4, 2017

(54) USER INTERFACE ASSEMBLIES AND ELECTRODE ASSEMBLIES HAVING INTERTWINED ELECTRODES

(71) Applicant: General Electric Company, Schenectady, NY (US)

(72) Inventor: Tyler James Doering, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 75 days.

(21) Appl. No.: 14/814,894

(22) Filed: Jul. 31, 2015

(65) Prior Publication Data

US 2017/0031475 A1 Feb. 2, 2017

(51) Int. Cl.
*G06F 3/044* (2006.01)
*G06F 3/041* (2006.01)
*F25D 11/00* (2006.01)
*F25D 23/12* (2006.01)

(52) U.S. Cl.
CPC .............. *G06F 3/044* (2013.01); *F25D 11/00* (2013.01); *F25D 23/12* (2013.01); *G06F 3/0416* (2013.01); *G06F 2203/04104* (2013.01)

(58) Field of Classification Search
CPC .................. G06F 3/041–3/047; F21V 23/0485
See application file for complete search history.

(56) References Cited

U.S. PATENT DOCUMENTS

| | | | |
|---|---|---|---|
| 4,076,596 A * | 2/1978 | Connery | G01N 27/4075 204/415 |
| 7,515,140 B2 | 4/2009 | Philipp | |
| 7,834,287 B2 * | 11/2010 | Heiman | D06F 39/005 200/600 |
| 8,823,675 B2 | 9/2014 | Sleeman | |
| 9,344,061 B1 * | 5/2016 | Tsironis | H03H 7/40 |

(Continued)

FOREIGN PATENT DOCUMENTS

EP 2166670 A1 3/2010

OTHER PUBLICATIONS http://www.datasheetlib.com/datasheet/50648/at42qt1040-mmh__atmel-corporation.html?page=44#datasheet "Mutual-capacitance Zero-dimensional Sensors"; printed Jul. 24, 2015; (4 pages).

*Primary Examiner* — Gene W Lee
(74) *Attorney, Agent, or Firm* — Dority & Manning, P.A.

(57) ABSTRACT

User interfaces and electrode assemblies are provided. A user interface includes a printed circuit board and an outer touch panel spaced from the printed circuit board. The user interface assembly further includes an electrode assembly disposed between the printed circuit board and outer touch panel. The electrode assembly includes a first conductive compressible electrode extending along a length between a first end and a second end and from the printed circuit board to the outer touch panel. The electrode assembly further includes a second conductive compressible electrode extending along a length between a first end and a second end and from the printed circuit board to the outer touch panel. The first and second electrodes are intertwined and define a gap therebetween. The gap is generally constant along the lengths of the first and second electrodes between the first ends and the second ends of the first and second electrodes.

14 Claims, 5 Drawing Sheets

(56) References Cited

U.S. PATENT DOCUMENTS

| | | | | |
|---|---|---|---|---|
| 2005/0179673 A1* | 8/2005 | Philipp | ............... | H03K 17/962 |
| | | | | 345/173 |
| 2007/0103451 A1* | 5/2007 | Heimann | ............. | D06F 39/005 |
| | | | | 345/173 |
| 2011/0221509 A1* | 9/2011 | Bergamo | ................ | G06F 3/044 |
| | | | | 327/517 |
| 2014/0160368 A1* | 6/2014 | Huang | .................... | G06F 3/044 |
| | | | | 349/12 |
| 2015/0305808 A1* | 10/2015 | Ku | .................... | A61B 18/1492 |
| | | | | 606/41 |
| 2015/0366610 A1* | 12/2015 | Tsuruta | ............. | A61B 1/00029 |
| | | | | 606/46 |

\* cited by examiner

USER INTERFACE ASSEMBLIES AND ELECTRODE ASSEMBLIES HAVING INTERTWINED ELECTRODES

FIELD OF THE INVENTION

The present disclosure relates generally to user interface assemblies, such as for appliances, and to electrode assemblies for use in the user interface assemblies. In particular, the present disclosure is directed to electrode assemblies which facilitate improved mutual capacitance touch capabilities.

BACKGROUND OF THE INVENTION

Households and offices generally include a variety of appliances for performing a variety of functions. For example, a household may include a refrigerator appliance, a dishwasher appliance, a microwave appliance, an oven appliance, a washer appliance and/or a dryer appliance. Such appliances typically include user interfaces which allow a user to interact with the appliance and provide commands for operation of the appliance.

One type of user interface is a touch surface user interface, such as a touchscreen or a plurality of touch buttons, wherein the user touches various locations on a plate which is typically formed of plastic or glass. A signal is transmitted to a controller of the appliance, and the controller interprets this signal and controls operation of the appliance based on the signal. The type of signal transmitted to the controller is based on the location on the plate at which the user contacts the plate.

One example of touch surface technology is capacitive touch technology, which generally measures changes in capacitance due to contact by a user with the touch plate. The location of the change in capacitance is sent to a controller for processing. In some cases, self-capacitance technology is utilized. A grid of electrodes is formed on a control board which is connected to the touch surface. To detect capacitance changes, each column and row is independently measured when a touch is occurring. However, such technology has limitations. In particular, when more than one touch occurs simultaneously, such technology is unable to accurately determine these multiple locations, rather indicating "ghost" locations along with correct locations.

More recently, mutual capacitance technology has been utilized. While producing weaker signals than self-capacitance approaches, mutual capacitance technology provides improved location determination accuracy and eliminates "ghosting". A grid of electrodes is again utilized, but each row (or column) is pulsed in turn and the columns (or rows) are measured for capacitance changes. Accordingly each node (i.e. each intersection between a column electrode and row electrode) is individually measured.

One drawback of presently known mutual capacitance technology is that the control board is typically required to be directly in contact with the touch plate. Accordingly, mutual capacitance applications have been limited to such applications and generally are not utilized when spacing between the control board and touch plate is desired. Recently, U.S. Pat. No. 8,823,675, issued on Sep. 2, 2014 and which is incorporated by reference herein in its entirety, provided disclosure related to the use of springs between the control board and touch plate. However, the springs are either only utilized for the column electrodes or row electrodes (and not both), or are utilized for both column and row electrodes but are spaced apart from each other, thus limiting the capacitance change detection abilities of the subject assemblies.

Accordingly, improved user interface assemblies are desired in the art. In particular, user interface assemblies which include features for facilitating improved mutual capacitance touch technology would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a user interface assembly is provided. The user interface includes a printed circuit board and an outer touch panel spaced from the printed circuit board. The user interface assembly further includes an electrode assembly disposed between the printed circuit board and the outer touch panel. The electrode assembly includes a first conductive compressible electrode extending along a length between a first end and a second end and from the printed circuit board to the outer touch panel. The electrode assembly further includes a second conductive compressible electrode extending along a length between a first end and a second end and from the printed circuit board to the outer touch panel. The first and second electrodes are intertwined and define a gap therebetween. The gap is generally constant along the lengths of the first and second electrodes between the first ends and the second ends of the first and second electrodes.

In accordance with another embodiment, an electrode assembly is provided. The electrode assembly includes a first conductive compressible electrode extending along a length between a first end and a second end, and a second conductive compressible electrode extending along a length between a first end and a second end. The first and second electrodes are intertwined and define a gap therebetween. The gap is generally constant along the lengths of the first and second electrodes between the first ends and the second ends of the first and second electrodes.

In accordance with another embodiment, a refrigerator appliance is provided. The refrigerator appliance includes a cabinet defining a fresh food chamber, a fresh food door rotatably hinged to the cabinet for accessing the fresh food chamber, a controller, and a user interface in communication with the controller. The user interface includes a printed circuit board and an outer touch panel spaced from the printed circuit board. The user interface assembly further includes an electrode assembly disposed between the printed circuit board and the outer touch panel. The electrode assembly includes a first conductive compressible electrode extending along a length between a first end and a second end and from the printed circuit board to the outer touch panel. The electrode assembly further includes a second conductive compressible electrode extending along a length between a first end and a second end and from the printed circuit board to the outer touch panel. The first and second electrodes are intertwined and define a gap therebetween. The gap is generally constant along the lengths of the first and second electrodes between the first ends and the second ends of the first and second electrodes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
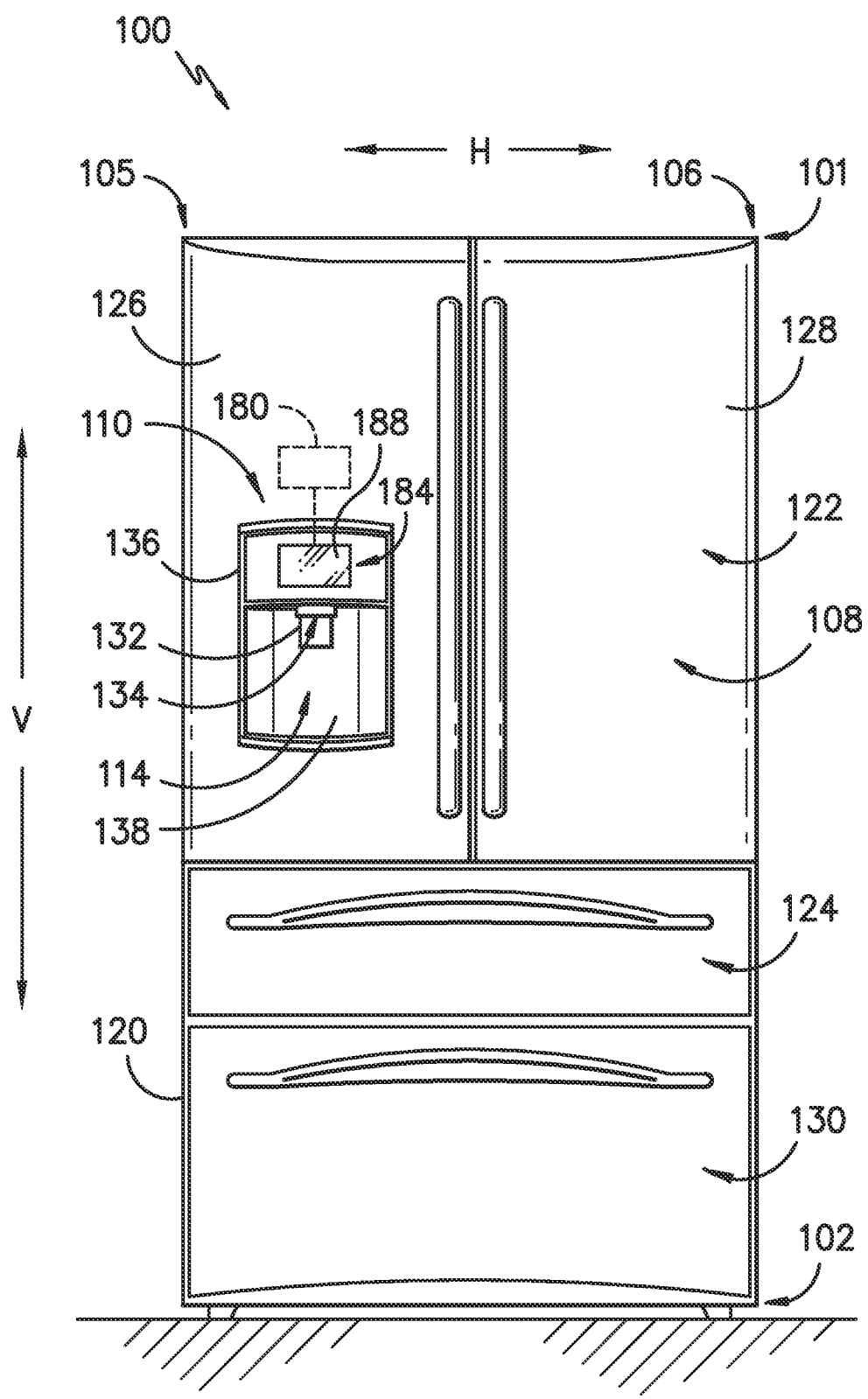
FIG. 1 provides a front view of a refrigerator appliance in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 extends between a top 101 and a bottom 102 along a vertical direction V. Refrigerator appliance 100 also extends between a first side 105 and a second side 106 along a horizontal direction H. Further, refrigerator appliance 100 extends between a front 108 and a back 109 along a transverse direction T, which may be defined perpendicular to the vertical and horizontal directions V, H.

Refrigerator appliance 100 includes a cabinet or housing 120 defining a fresh food chamber 122 and one or more freezer chambers, such as first freezer chamber 124 and second freezer chamber 125, which may be arranged below the fresh food chamber 122 on the vertical direction V. As such, refrigerator appliance 100 may generally be referred to as a bottom mount refrigerator. In the exemplary embodiment, housing 120 also defines a mechanical compartment (not shown) for receipt of a sealed cooling system (not shown). Using the teachings disclosed herein, one of skill in the art will understand that the present invention can be used with other types of refrigerators (e.g., side-by-sides) or a top freezer appliance as well. Consequently, the description set forth herein is for illustrative purposes only and is not intended to limit the invention in any aspect.

Refrigerator doors 126 are rotatably hinged to an edge of housing 120 for accessing fresh food chamber 122. For example, upper and lower hinges may couple each door 126 to the housing 120. It should be noted that while two doors 126 in a "french door" configuration are illustrated, any suitable arrangement of doors utilizing one, two or more doors is within the scope and spirit of the present disclosure. Freezer doors, such as first freezer door 130 and second freezer door 131, are arranged below refrigerator doors 126 for accessing freezer chamber, such as first and second freezer chambers 124, 125, respectively. In the exemplary embodiment, freezer doors 130, 131 are coupled to freezer drawers (not shown) slidably coupled within freezer chambers 124, 125. Such drawers are thus generally "pull-out" drawers in that they can be manually moved into and out of the freezer chambers 124, 125 on suitable slide mechanisms.

Figure 2:
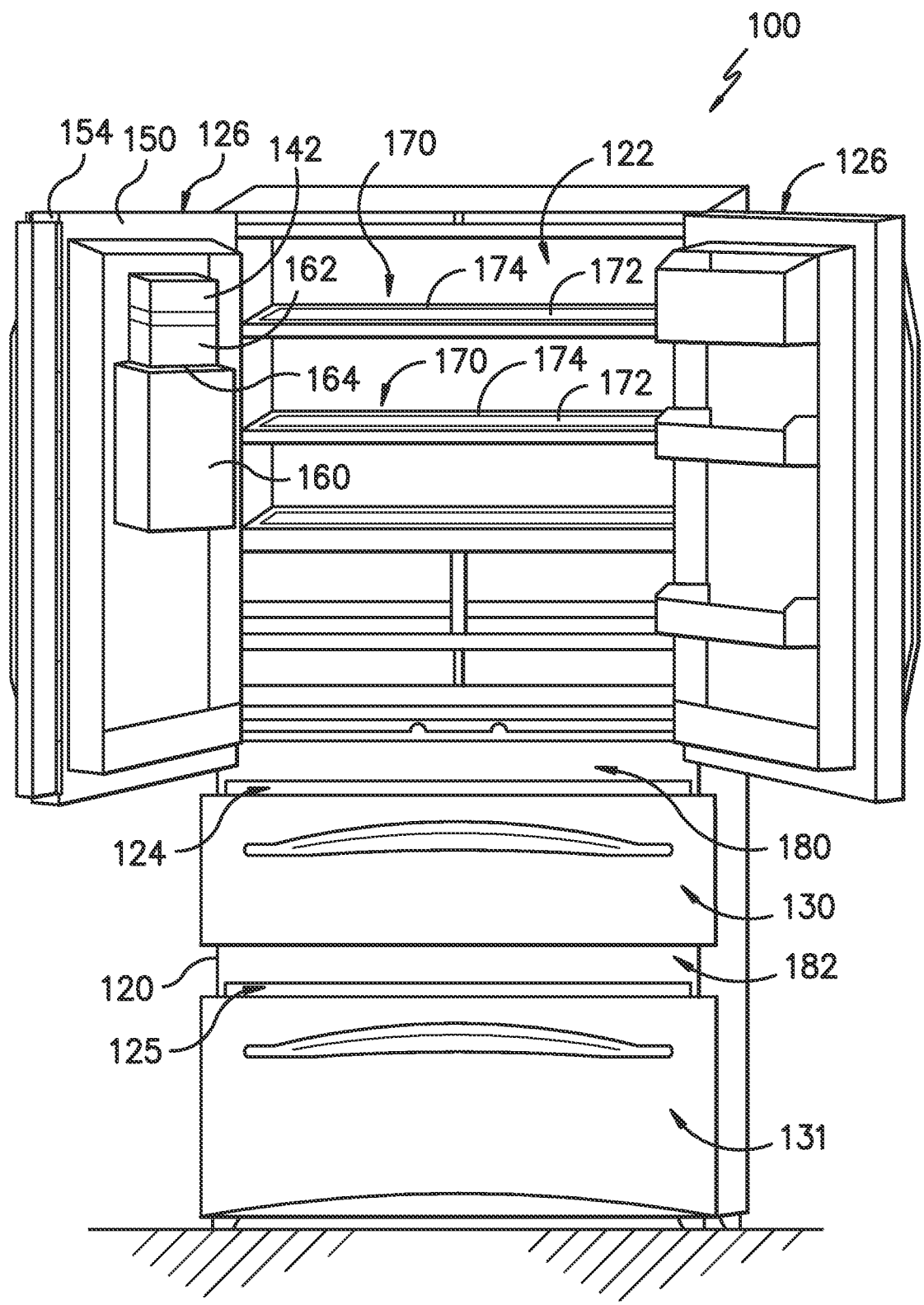
FIG. 2 provides a front view of the refrigerator appliance of FIG. 1 with refrigerator doors of the refrigerator appliance shown in an open configuration to reveal a fresh food chamber and freezer chambers of the refrigerator appliance.

FIG. 2 is a perspective view of refrigerator appliance 100 having refrigerator doors 126 in an open position to reveal the interior of the fresh food chamber 122. Additionally, freezer doors 130, 131 are shown in open positions to reveal the interior of the freezer chambers 124, 125.

A door 126 of the refrigerator appliance 100 may include an inner surface 150 and an outer surface 152. The inner surface 150 generally defines the interior of the fresh food chamber 122 when the door 126 is in a closed position as shown in FIG. 1, while the outer surface 152 is generally opposite the inner surface 150 and defines the exterior of the refrigerator appliance. Side surfaces 154 may extend between and connect the inner surface 150 and outer surface 152.

One or more shelves 170 may be disposed within the fresh food chamber 122 and/or a freezer chamber 124, 125 for placing articles thereon in the chamber(s). Each shelf may include a panel assembly 172, and may further include a frame at least partially surrounding the panel assembly 174.

Refrigerator appliance 100 may further include a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. A single paddle 132 is mounted below discharging outlet 134 for operating dispenser 114. A user interface assembly 136 is provided for controlling the mode of operation. For example, user interface 136 may include a water dispensing button or touch location (not labeled) and an ice-dispensing button or touch location (not labeled) for selecting a desired mode of operation such as crushed or non-crushed ice.

Discharging outlet 134 and paddle 132 as shown are an external part of dispenser 114, and are mounted in a recessed portion 138 defined in an outside surface of refrigerator door 126. Recessed portion 138 is positioned at a predetermined elevation convenient for a user to access ice or water enabling the user to access ice without the need to bend-over and without the need to access freezer chamber 124. In the exemplary embodiment, recessed portion 138 is positioned at a level that approximates the chest level of a user.

Further components of dispensing assembly 110 are illustrated in FIG. 2. Dispensing assembly 110 includes an insulated housing 142 mounted to door 126. Due to the insulation which encloses insulated housing 142, the temperature within insulated housing 142 can be maintained at levels different from the ambient temperature in the surrounding fresh food chamber 122.

The insulated housing 142 is constructed and arranged to operate at a temperature that facilitates producing and storing ice. More particularly, the insulated housing 142 contains an ice maker for creating ice and feeding the same to an ice container 160, both of which may be mounted on refrigerator door 126. As illustrated in FIG. 2, container 160 is placed at a vertical position on refrigerator door 126 that will allow for the receipt of ice from a discharge opening 162 located along a bottom edge 164 of insulated housing 142.

The operation of refrigerator appliance 100 may be controlled by a processing device such as a controller 180, which may include a microprocessor or other device that is in communication with such components. Refrigerator appliance 100 may further include a user interface assembly 136, as mentioned. User interface assembly 136 is generally a component that allows a user to interact with the refrigerator appliance 100 to, for example, adjust the temperature of various cooling assemblies, dispense ice and/or water, set built-in timers, etc. A user interface assembly 136 may include an outer touch panel or touch surface 184 and a graphical display which may be separate from or a part of the touch surface 184. The touch surface 184 serve as the point-of-contact for a user touching and thus interacting with the user interface assembly 136. The touch surface 184 may be utilized by a user to interact with the refrigerator appliance 100 by touching the touch surface 184 directly with, for example, a finger. Various commands for a user to select through such touching may be displayed by or through touch surface 184, and detection of the user selecting a specific command by touching a distinct location on the touch surface 184 may be detected by the controller 180, which is in communication with the touch surface 184, based on electrical signals from the touch surface 184 as discussed herein. The graphical display may generally deliver certain information to the user, which may be based on user selections and interaction with the touch surface 184, such as temperatures maintained within the various chambers, etc.

Notably, controller 180 may be in communication with the user interface assembly 136 and one or more cooling assemblies (which may operate in refrigeration cycles, as is generally understood) and/or other components of the refrigerator appliance 100. Accordingly, input signals received from the touch surface 184 may be provided to and interpreted by the controller 180, and the controller 180 may output corresponding control signals to the cooling assemblies to operate the cooling assemblies as desired.

Controller 180 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. User interface assembly 136 and other components of refrigerator appliance 100 may be in communication with controller 180 via one or more signal lines or shared communication busses.

It should be understood that the present disclosure is not limited to refrigerator appliances, and rather than any suitable appliance or apparatus which utilizes a user interface assembly is within the scope and spirit of the present disclosure. Exemplary suitable appliances include, for example, dishwasher appliances, microwave appliances, oven appliances, washer appliances, dryer appliances, etc.

Figure 3:
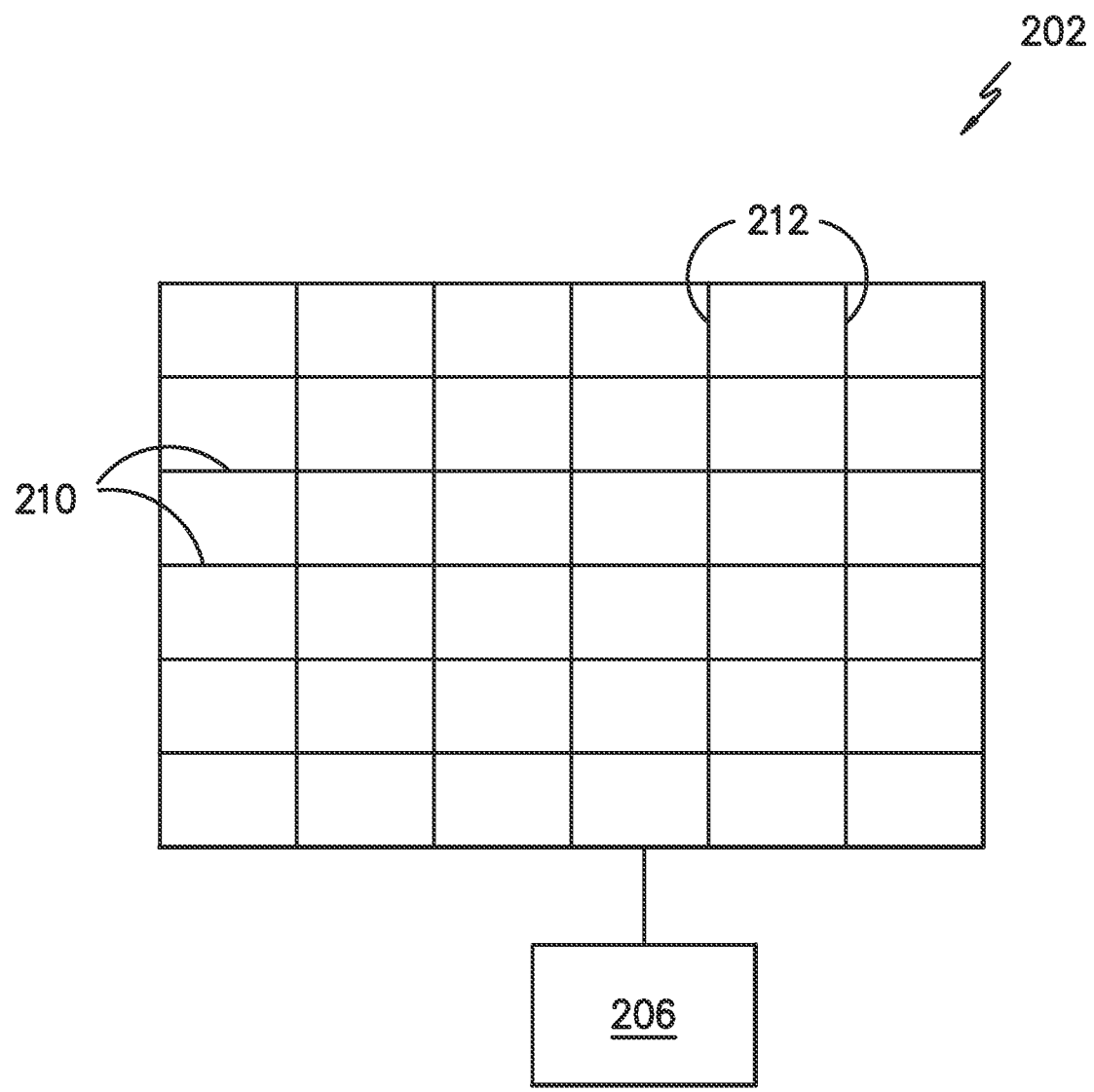
FIG. 3 is a top schematic view of components of a user interface assembly, including a printed control board thereof, connected to a controller in accordance with one embodiment of the present disclosure.
Figure 4:
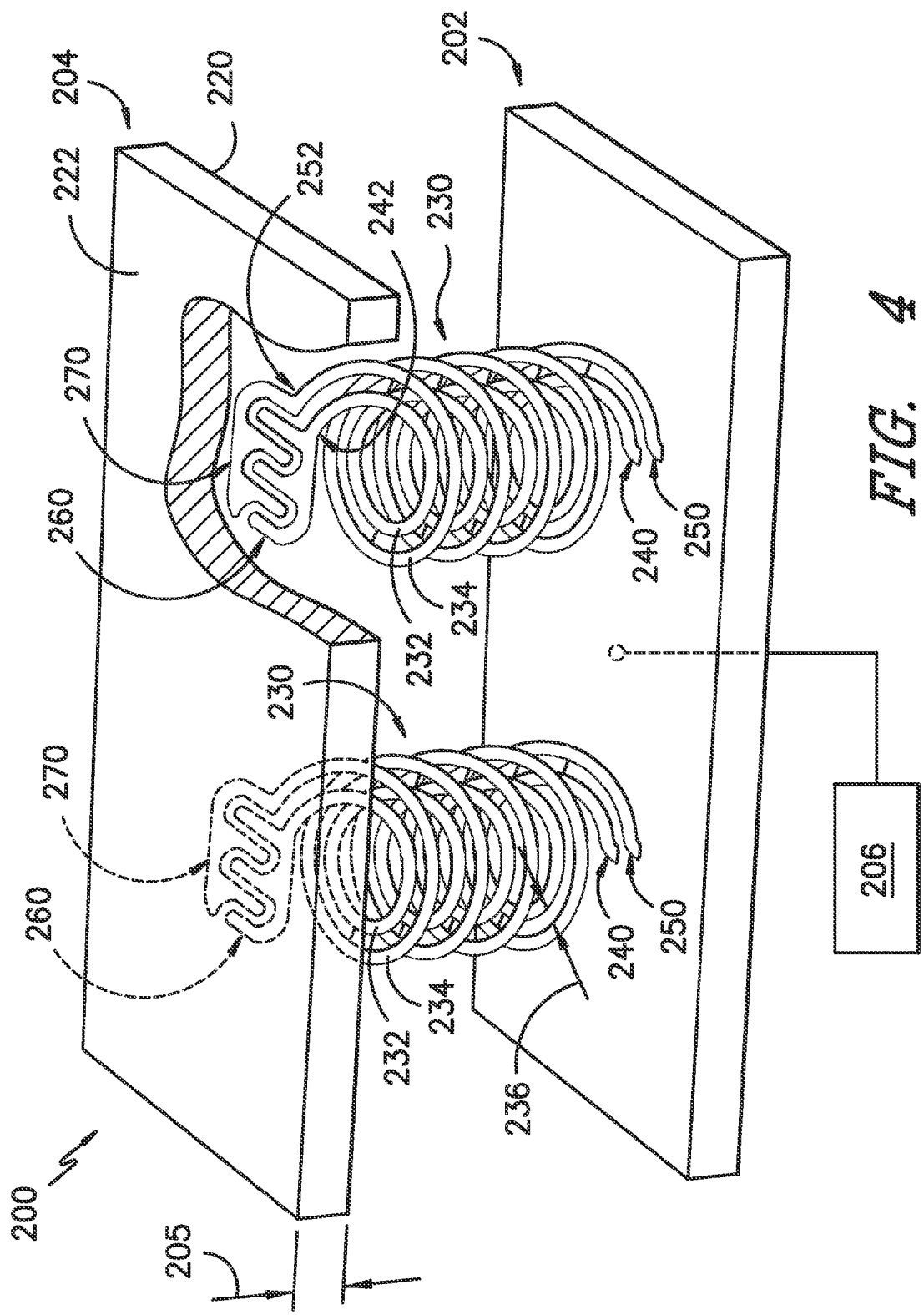
FIG. 4 is a side schematic view of a user interface assembly in accordance with one embodiment of the present disclosure.
Figure 5:
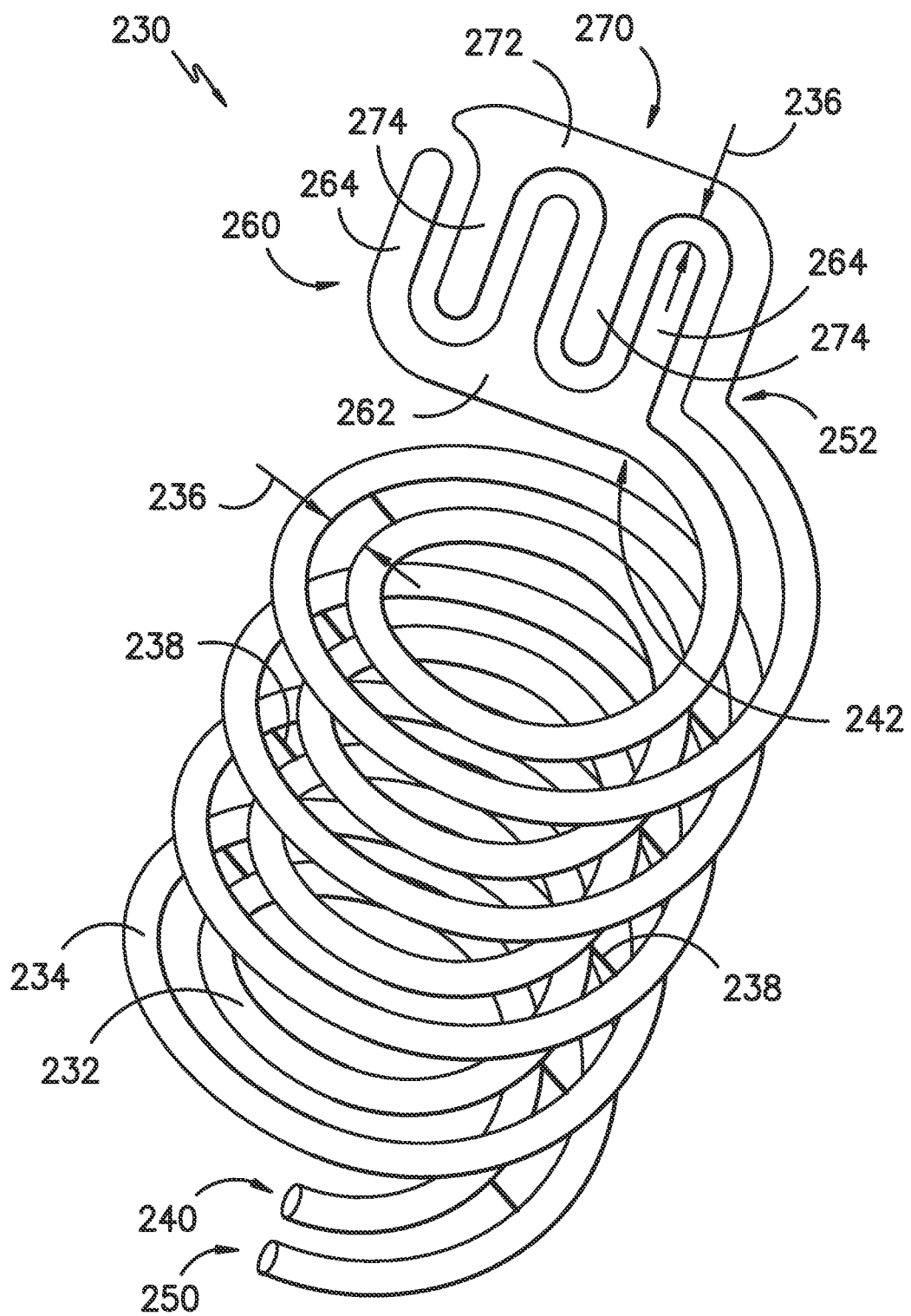
FIG. 5 is a perspective view of one embodiment of an electrode assembly in accordance with one embodiment of the present disclosure.

Referring now to FIGS. 3 through 5, embodiments of a user interface assembly 200 and components thereof are illustrated. In some embodiments, for example, user interface assembly 200 may be user interface assembly 136 of a refrigerator appliance or a user interface assembly of another suitable appliance or apparatus.

As shown, user interface assembly 200 includes a printed circuit board ("PCB") 202 and an outer touch panel 204 (which may be touch surface 184). As shown, the PCB 202 includes a plurality of electrodes arranged thereon in a matrix of columns and rows, and thus referred to as X electrodes 210 and Y electrodes 212. The electrodes 210, 212 may, for example, be arranged in a matrix on a surface 214 of the PCB 202. In general, PCB 202 may be in communication with a controller 206, such as controller 180 as discussed above. Controller 206 may thus be capable of interpreting signals sent to controller 206 from PCB 202.

PCB 202 may utilize mutual capacitance to detect user interactions with assembly 200 generally. Accordingly, the X electrodes 210 may for example be transmitting electrodes, while the Y electrodes 212 are receiving electrodes. The X electrodes 210 may thus be pulsed in turn, and the Y electrodes 212 measured for capacitance changes when a user contacts the user interface assembly. A change at any particular X,Y intersection is correlated to a particular function. When such change is sensed, a signal is sent to the controller 206, which interprets the signal and controls the associated apparatus, such as the associated appliance 100, based on this signal.

Outer touch panel 204 is generally the panel that a user contacts to provide an input to assembly 200 and controller 206. As shown, outer touch panel 204 is spaced from the PCB 202. Outer touch panel 204 may include an inner surface 220 and an outer surface 222. Inner surface 220 may face and be spaced from the PCB 202, while outer surface 222 is opposed to inner surface 220 and faces away from PCB 202. A user interacting with assembly 200 may contact the outer surface 222. In some embodiments, the surfaces 220, 222 may be planer, while in other embodiments, the surfaces 220, 222 or portions thereof may be curviplaner.

Outer touch panel 204 may be formed from a suitable material such as a glass or plastic. In some embodiments, outer touch panel 204 may include various decorative coatings applied thereon to indicate various indicia for user selection. Alternatively, such selection indicia may be provided by a light source, printed on another component of the assembly 200, etc.

Assembly 200 further includes one or more electrode assemblies 230. Each electrode assembly 230 is disposed between the PCB 202 and the outer touch panel 204, such as in the gap therebetween. Further, as discussed herein, components of the electrode assembly 230 may contact the PCB 202 and the outer touch panel 204 and provide electrical communication therebetween.

As shown, electrode assembly 230 includes a first conductive compressible electrode 232 and a second conductive compressible electrode 234. Each electrode 232, 234 extends along a length between a first end 240, 250 and a second end 242, 252 and from the PCB 202 to the outer touch panel 204. In particular, the first end 240 of the first electrode 232 may directly contact or otherwise be in electrical communication with either an X electrode 210 or a Y electrode 212, and the first end 250 of the second electrode 234 may directly contact or otherwise be in electrical communication with the other of an X electrode 210 or a Y electrode 212. The one of the first and second electrodes 232, 234 in electrical communication with the X electrode 210 may thus be a transmitting electrode, and the one of the first and second electrodes 232, 234 in electrical communication with the Y electrode 212 may thus be a receiving electrode.

It should be noted that, in some embodiments, one or both of the electrodes 232, 234 may be both a transmitting and receiving electrode. In these embodiments, the electrodes 232, 234 can be utilized for mutual- and self-capacitance approaches, and/or can be switched between being pulsed or being measured.

Electrodes 232, 234 may advantageously facilitate transmission of capacitance changes detected at outer touch panel 204 to PCB 202 for sensing and signal transmission to controller 206. Further, as discussed herein, the electrodes 232, 234 may be intertwined, thus facilitating improved capacitance change sensing and transmission. By utilizing electrode assemblies 230 in accordance with the present disclosure, associated user interface assemblies 200 with improved mutual capacitance features can advantageously be utilized which do not require direct contact between the PCB and touch panel. Rather, the PCB and panel can advantageously be spaced apart to provide the benefits of such arrangement while still benefiting from improved mutual capacitance operation.

As discussed and as shown, the first and second electrodes 232, 234 are intertwined, such as in a neighboring spiral-type arrangement. Further, the electrodes 232, 234 do not contact each other, and rather are spaced apart while being intertwined as shown such that a gap 236 is defined between the electrodes 232, 234. In particular, the gap 236 is generally constant along the lengths of the neighboring electrodes 232, 234 between their first ends 240, 250 and second ends 242, 252. For example, a gap 236 at any location along the electrodes 232, 234 may be measured tangentially to the electrodes 232, 234 at that location along the electrodes 232, 234. This gap 236 size may remain generally constant throughout the electrodes 232, 234 between the first and second ends thereof.

In some embodiments as shown, spacers 238 formed of a non-conductive material may be utilized to maintain the generally constant gap 236 size throughout the lengths of the electrodes 232, 234. Alternatively the electrodes 232, 234 may be overmolded together to generally solidify the gap 236 size or otherwise secured in place relative to each other such that the gap 236 remains constant.

In exemplary embodiments, gap 236 may be between approximately 0.25 times a thickness 205 of the outer touch panel 204 and approximately 0.5 times a thickness 205 of the outer touch panel 204. The thickness 205 may for example be a maximum thickness 205 or average thickness 205 for the panel 204, or may be a thickness 205 at a location wherein the electrode assembly 230 is in electrical communication with the outer touch panel 204.

In exemplary embodiments, as shown, the first electrode 232 and second electrode 234 each extend generally helically along their respective lengths between the first ends 240, 250 and second ends 242, 252 thereof. Accordingly, first electrodes 232, 234 may generally resemble and act as compression springs. Alternatively, any suitable shape or pattern for each electrode 232, 234 (while maintaining the constant gap 236) is within the scope and spirit of the present disclosure.

Each electrode 232, 234 is, as discussed, conductive and compressible. As discussed, the electrodes 232, 234 may have spring-like shapes, and thus be compressible. Further, each electrode 232, 234 may be formed from a suitable conductive material, such as a metal. Suitable metals include, for example, tin, copper, steel (stainless or regular), etc.

In some embodiments, the second ends 242, 252 of the electrodes 232, 234 may contact the outer touch panel 204, such as the inner surface 220 thereof, to provide electrical communication between the outer touch panel 204 and the electrode assembly 230 (and thus the PCB 202). Alternatively, as shown, each electrode 232, 234 may further include an upper contact portion 260, 270 extending from the second end 242, 252 thereof. The upper contact portion 260, 270 may contact the outer touch panel 204, such as the inner surface 220 thereof, to provide such electrical communication.

The upper contact portions 260, 270 may generally facilitate increased area for capacitive change sensing by increasing the surface area of the outer touch panel 204, such as the inner surface 220 thereof, which the electrodes 232, 234 contact. For example, an upper contact portion 260, 270 may include an arm portion 262, 272 and a plurality of finger portions 264, 274 extending therefrom. As illustrated, the arm portions 262, 272 and finger portions 264, 274 may be arranged such that the gap 236 is further defined therebetween and remains generally constant between the neighboring arm portions 262, 272 and finger portions 264, 274 of the electrodes 232, 234. Alternatively, an upper contact portion 260, 270 may have a spiral shape or other suitable shape. In exemplary embodiments, the gap 236 is further defined between the upper contact portions 260, 270 and remains generally constant between the upper contact portion 260, 270. Spacers 238 or other apparatus may be utilized between upper contact portions 260, 270 to maintain the generally constant gap 236 as desired or required.

In some exemplary embodiments as shown, the upper contact portions 260, 270 are generally planer. For example, such embodiments may be utilized with planer panels 204 and inner surfaces 220 thereof. Alternatively, upper contact portions 260, 270 may be curviplaner. For example, such embodiments may be utilized with curviplaner panels 204 and inner surfaces 220 thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A user interface assembly, comprising:
a printed circuit board;
an outer touch panel spaced from the printed circuit board; and
an electrode assembly disposed between the printed circuit board and the outer touch panel, the electrode assembly comprising:
a first conductive compressible electrode extending along a length between a first end and a second end and from the printed circuit board to the outer touch panel; and a second conductive compressible electrode extending along a length between a first end and a second end and from the printed circuit board to the outer touch panel, wherein the first and second electrodes are intertwined and define a gap therebetween, the gap generally constant along the lengths of the first and second electrodes between the first ends and the second ends of the first and second electrodes.

2. The user interface assembly of claim 1, the first electrode further comprising an upper contact portion extending from the second end of the first electrode, the upper portion comprising an arm portion and a plurality of finger portions extending therefrom, the second electrode further comprising an upper contact portion extending from the second end of the second electrode, the upper portion comprising an arm portion and a plurality of finger portions extending therefrom, the arm portions and finger portions of the first and second electrodes further defining the gap therebetween, the gap generally constant between the neighboring arm portions and finger portions.

3. The user interface assembly of claim 2, wherein the upper contact portions of the first and second electrodes contact the outer touch panel.

4. The user interface assembly of claim 2, wherein the upper contact portions of the first and second electrodes are generally planer.

5. The user interface assembly of claim 1, wherein the first electrode extends generally helically along the length between the first end and the second end of the first electrode, and wherein the second electrode extends generally helically along the length between the first end and the second end of the second electrode.

6. The user interface assembly of claim 1, wherein the first electrode is a transmitting electrode and the second electrode is a receiving electrode.

7. The user interface assembly of claim 1, wherein at least one of the first electrode or the second electrode is a transmitting and receiving electrode.

8. The user interface assembly of claim 1, wherein the gap between approximately 0.25 times a thickness of the outer touch panel and approximately 0.5 times the thickness of the outer touch panel.

9. The user interface assembly of claim 1, wherein the outer touch panel is formed from glass.

10. The user interface assembly of claim 1, wherein the first electrode and the second electrode are each formed from a metal.

11. A refrigerator appliance, comprising:
a cabinet defining a fresh food chamber;
a fresh food door rotatably hinged to the cabinet for accessing the fresh food chamber;
a controller; and
a user interface in communication with the controller, the user interface comprising:
a printed circuit board;
an outer touch panel spaced from the printed circuit board; and
an electrode assembly disposed between the printed circuit board and the outer touch panel, the electrode assembly comprising:
a first conductive compressible electrode extending along a length between a first end and a second end and from the printed circuit board to the outer touch panel; and
a second conductive compressible electrode extending along a length between a first end and a second end and from the printed circuit board to the outer touch panel,
wherein the first and second electrodes are intertwined and define a gap therebetween, the gap generally constant along the lengths of the first and second electrodes between the first ends and the second ends of the first and second electrodes.

12. The refrigerator appliance of claim 11, the first electrode further comprising an upper contact portion extending from the second end of the first electrode, the upper portion comprising an arm portion and a plurality of finger portions extending therefrom, the second electrode further comprising an upper contact portion extending from the second end of the second electrode, the upper portion comprising an arm portion and a plurality of finger portions extending therefrom, the arm portions and finger portions of the first and second electrodes further defining the gap therebetween, the gap generally constant between the neighboring arm portions and finger portions.

13. The refrigerator appliance of claim 11, wherein the first electrode extends generally helically along the length between the first end and the second end of the first electrode, and wherein the second electrode extends generally helically along the length between the first end and the second end of the second electrode.

14. The refrigerator appliance of claim 11, wherein the gap between approximately 0.25 times a thickness of the outer touch panel and approximately 0.5 times the thickness of the outer touch panel.

* * * * *